May 31, 1966   J. M. THOMPSON   3,253,689
INSURANCE VENDING MACHINE
Filed April 7, 1964                     2 Sheets-Sheet 1
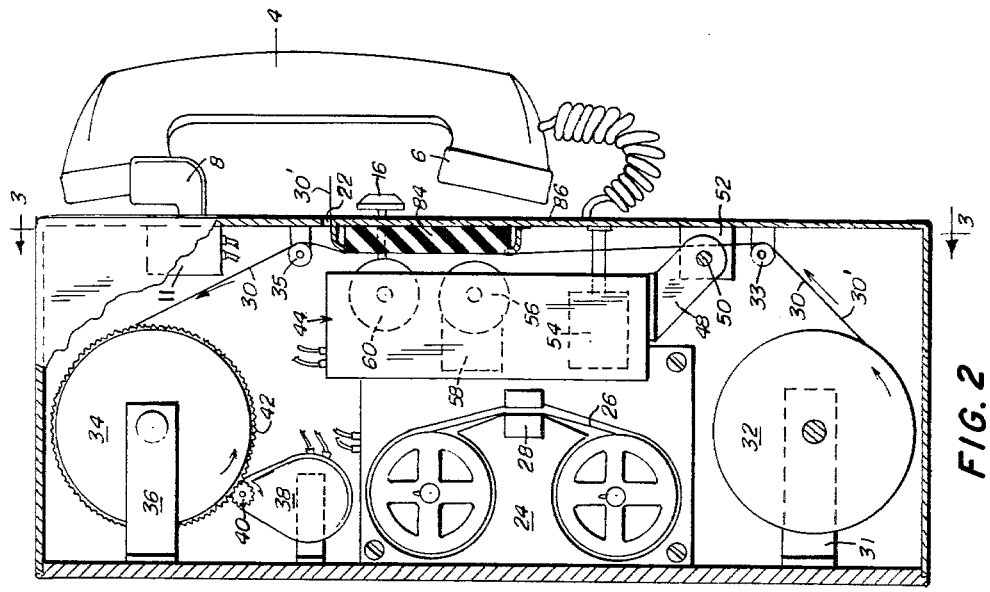
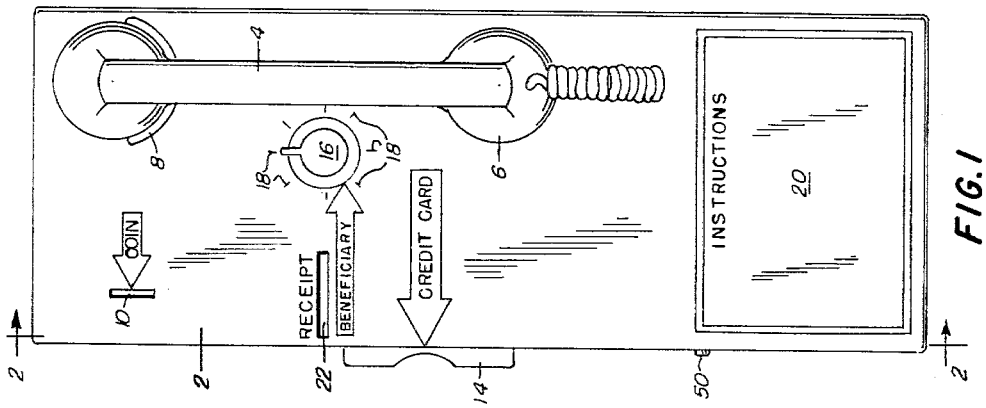
INVENTOR
JACK M. THOMPSON
BY Beale and Jones
ATTORNEYS May 31, 1966   J. M. THOMPSON   3,253,689
INSURANCE VENDING MACHINE
Filed April 7, 1964   2 Sheets-Sheet 2
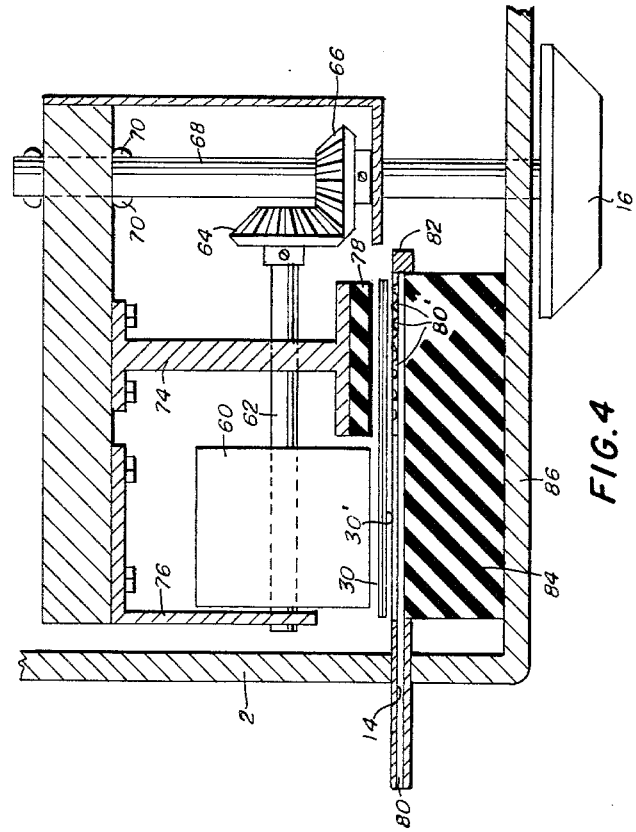
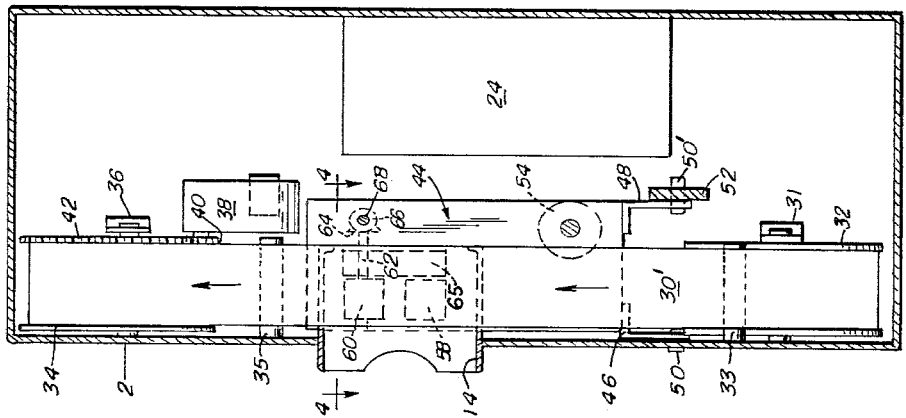
INVENTOR
JACK M. THOMPSON
BY Beale and Jones
ATTORNEYS 3,253,689
INSURANCE VENDING MACHINE
Jack M. Thompson, Highway 70 E. and C St.,
Box 1771, Ardmore, Okla.
Filed Apr. 7, 1964, Ser. No. 357,890
3 Claims. (Cl. 194—9)

This invention relates to a machine for vending insurance, and especially to insurance vending machines which may be located in railroad stations, air terminals, and other public places frequented by traveling persons.

Insurance vending machines are well known to travelers, and they frequently can be a source of harassment to those who have difficulty understanding written instructions, and those who do not have sufficient time to read all the instructions, fill out the forms, and deposit currency in the machine. Machines of this type generally require the completion of a written form which can, of course, be a somewhat time-consuming and confusing matter.

It is an object of this invention to improve over prior art devices of this type, by providing an insurance vending machine which is simple to understand, easy to operate and which does not require a significant length of time to operate. Another object of this invention is to provide a compact unit which may be wall-mounted much in the same manner as conventional telephones. The machine of this invention may bear close similarity in appearance to coin-operated telephones, inasmuch as a microphone is provided in a handpiece which closely resembles or is identical to that of an ordinary telephone. This microphone is used in conjunction with a voice recording device so that rather than writing out the information required for a policy, such information may simply be spoken and automatically recorded within this vending machine.

Still another object of the invention is to provide a simple means whereby the insurance purchaser may select the designated beneficiary of the policy.

A further object is to provide a simple and compact structure whereby a receipt of the insurance may be imprinted with the name of the insured, the designated beneficiary, and the time at which the insurance is purchased.

The satisfaction of these and other objects will be more clearly understood by referring to the following description and the drawings wherein:

FIG. 1 is a front elevation of the insurance vending machine, showing the exterior location of the various elements which will appear to a person purchasing insurance;

FIG. 2 is a side elevation of the machine, partially in section, showing the preferred location of the working elements within the machine housing;

FIG. 3 is a sectional view taken from the front of the machine, also showing the positioning of the various interiorly located elements; and FIG. 4 is a sectional view taken along line 4—4 in FIGS. 2 and 3, showing some of the details of the receipt imprinting means, Referring to FIG. 1, it will be seen that the machine presents a simple and uncomplicated outward appearance. The housing 2 carries a handpiece 4 quite similar to a telephone handpiece and embodying a microphone portion 6. The handpiece 4 is supported in its stored and inoperative position by means of an appropriately curved arm 8 which operates a switch, not shown, located within the housing 2.

Also located on the front of the housing is a conventional coin slot 10 which has an electrical switch 11 located therebehind which closes a circuit when a coin is dropped in the slot. Any suitable well-known switch mechanism of this type may be employed. A slot 22 is the opening through which the receipt of the insurance is dispensed to the purchaser.

So that the purchaser may easily select the beneficiaries which he desires, a beneficiary knob 16 is located on the front of the machine. This knob may be turned so that a pointer or other indicator thereon may align with selectable indicia which are associated with the indexing lines 18. A wide variety of selectable beneficiaries may be provided; for example, sopuse, mother, father, mother and father, sister, sisters, daughter, daughters and sons, estate, etc.

It is expected that most persons using a machine of this type will carry credit cards of various types, and these credit cards are used for imprinting the name of the insured party on the receipt. Therefore, a credit card slot 14 through which the card is inserted is located at the edge of the machine.

The relatively simple instructions for operating the machine may be located at 20.

Within the housing, and electrically connected to the microphone 6 is a voice recording device such as a tape recorder 24 which employs magnetic tape 26 and a recording head 28. It is this recording device that makes a permanent record of the intelligence spoken into the microphone 6, such as the name of the insured, his address and the designated beneficiary.

Also within the housing 2 are means for supplying and holding the written receipts; means for imprinting a receipt with the identity of designated beneficiary, the date and time of the purchase, and the name of the insured; and the various electronic components, all of which are commercially available and capable of being connected using a variety of simple circuits to provide the desired operation of the machine. Some of the mechanical features of these units are discussed in detail hereinbelow.

RECEIPT FEEDING AND DISPENSING

Turning to FIG. 2, it will be seen that a large supply of the receipts is held by a spool 32 which is pivotally mounted on a pair of arms such as 31. Since it is desired that one receipt will go to the purchaser and another receipt to the insurance company they are fed simultaneously from the reel 32. The receipts 30 pass over guide rollers 33 and 35 which hold it vertically through the printing mechanism, which is described in detail later. Then, the receipt for the insurance company is taken up on a reel 34 located in the upper part of the machine. Reel 34 is supported on an arm such as 36. A series of relatively small teeth 42 are located on one of the flanges of reel 34, and these teeth are engaged by a spur gear 40 which projects from the housing of an electric motor 38. The motor serves to rotate reel 34 which advances the receipts 30 and dispenses the customer's receipt 30' through dispensing slot 22.

BENEFICIARY DIAL

As discussed above, the purchaser may select a designated beneficiary simply by rotating the dial or knob 16. One suitable mechanism by which this can be accomplished is shown in FIG. 4. A supporting plate 72 which is a part of the printing carriage has a pair of bracket members 74 and 76 which support the shaft upon which a beneficiary stamp 60 is located. This stamp 60 carries raised printing indicia thereon for printing the selected beneficiary's relationship to the insured on both copies of the receipt 30. This printing wheel or beneficiary stamp 60 rotates with shaft 62. Bevel gear 64 is attached to shaft 62 and meshes with a similar gear 66 which is located on the rod 68 attached to the beneficiary knob 16.

The rod 68 may have small projections 70 on the extreme end thereof so that it will move in conjunction with the plate 72. It will be seen that rotation of the beneficiary knob 16 will cause different portions of the printing indicia on stamp 60 to face toward the receipt 30, so that this indicia may later be impressed against the receipt 30.

PRINTING MECHANISM

The beneficiary stamp, discussed above, is mounted on a carriage 44 which is pivotally supported by pins 50 and 50' which pass through the downwardly extending arms 46 and 48. As shown in FIG. 2, this carriage has mounted thereon, in addition to the beneficiary stamp 60, a date-time stamp 56 and a clock mechanism 58 which causes the date-time stamp to rotate to record the proper date and time. The carriage and the printing rollers are the means which print the date on the receipt held between the guide rollers 33 and 35.

Also mounted on this carriage is a conventional solenoid member 54 which has its plunger rod 55 attached to the front wall of the housing 2.

When the solenoid is energized and the plunger rod thereof is drawn into the coil body, the printing means is actuated since carriage 44 will be cause to rock forwardly, thus bringing the beneficiary stamp 60 and the date-time stamp 56 into contact with the receipt 30. This contact will cause the type on the various printing members to print indicia on the receipts.

In addition to the above, the movement of the carriage will also cause the name of the purchaser on a credit card to be impressed on the receipts. It is intended that a credit card will be inserted and held by the credit card slot 14 on its side edge with the raised letters on the card facing the rear of the machine and entering the credit card slot first. When this is done, the raised letters of the credit card will be located in the position indicated by the rectangular area designated 65 in FIG. 3 opposite and proximate to the printing means. When in this position, the beneficiary stamp 60 and the date-time stamp 56 will lie opposite to the portion of the credit card which has no raised letters. This is best illustrated in FIG. 4 which shows the raised letters 80' on the credit card.

Preferably, there is a backing pad 84 between the credit card 80 and the front wall 86 of the machine housing. This, of course, assists in getting a good impression from the stamps 56 and 60. Also, there is provided on the moving carriage a resilient pad 78 which lies on the side of the receipt tape which is opposite to the raised letters 80' on the credit card. This assists in obtaining a good impression of the name of the insurance purchaser.

There are, of course, various types of papers which may be suitably used in this device. Certain pressure-sensitive papers are capable of producing a satisfactory impression without the use of ink or carbon; however, separate carbon papers or sheets with a carbon printed surface on reverse sides will be satisfactory.

OPERATION

The operation of this device is simple both from the standpoint of its mechanical operations, and especially from the standpoint of a purchaser of insurance. The purchaser simply removes the handpiece 4 from the supporting arm 8, places his credit card in slot 14, turns the beneficiary knob 16 to the desired beneficiary or beneficiaries, and places a coin in the slot 10. He then speaks into the microphone 6 to give the desired information to the recording device 24. When this information has been recorded, the handpiece 4 is returned to the support 8, and the customer's receipt 30' is delivered through the slot 22.

Within the machine, the operations are as follows: when the hand piece 4 is lifted from the support 8, a switch is closed. Insertion of a coin in the slot closes switch 11 to complete the circuit and actuate the recording mechanism 24. A voice modulation switch, well known in the telephone field, may automatically shut off the recording device if there is no speech into the microphone 6 for a given period of time. When the handpiece is replaced on the support 8, the circuit to the recording device is opened, the solenoid 54 is energized to cause the printing means to print the information on the receipts 40. Thereafter, the motor 38 is automatically actuated to cause the receipt 30 to be drawn onto the reel 34 and the customer's receipt 30 to dispense through the slot 30. The various circuits capable of performing these operations are relatively simple and within the ordinary skill of those in the field of electronics.

SUMMARY

From the foregoing it will be seen that the machine of this invention is capable of greatly simplifying the procedure of purchasing insurance from a vending machine. The various structural features discussed above are combined to provide a most useful, compact, and simple device for the sale of insurance. Numerous modifications to the invention will appear to those skilled in the art; however, this invention is not limited to the sole device disclosed herein but extends to the many embodiments which may fall within the scope of the claims which follow.

I claim:
1. An insurance vending machine comprising
 (a) a microphone,
 (b) means for recording intelligence spoken into said microphone,
 (c) and coin operated switch means for actuating said recording means,
 (d) means for supporting said microphone in a stored and inoperative position,
 (e) means holding a written receipt of insurance,
 (f) printing means for printing data on said receipt in said holding means, and
 (g) means actuating said printing means in response to placement of said microphone on said supporting means.
2. The insurance vending machine of claim 1 having
 (h) means for dispensing a written receipt subsequent to actuation of said printing means.
3. An insurance vending machine comprising
 (a) a movable hand-held microphone connected to a length of flexible electrical conductive material,
 (b) means for recording intelligence spoken into said microphone,
 (c) switch means operable solely by insertion of a coin thereinto to actuate said recording means,
 (d) movable support means constructed and arranged to support and suspend said microphone in a stored and inoperative position,
 (e) means holding a written receipt of insurance,
 (f) printing means for printing data on a receipt in said holding means, and
 (g) means actuating said printing means in response to placement of said movable microphone on said movable support means.

References Cited by the Examiner

UNITED STATES PATENTS

| | | |
|---|---|---|
| 2,598,394 | 5/1952 | Kilgore. |
| 2,833,866 | 5/1958 | Esser _____ 179—100.1 |
| 2,925,475 | 2/1960 | Zorn _____ 194—15 |
| 3,061,143 | 10/1963 | Simjian. |
| 3,112,019 | 11/1963 | Simjian _____ 194—2 |

FOREIGN PATENTS 825,274 12/1959 Great Britain.

SAMUEL F. COLEMAN, *Primary Examiner.*

H. C. HORNSBY, *Assistant Examiner.*